(12) United States Patent
Chen

(10) Patent No.: US 6,322,880 B1
(45) Date of Patent: Nov. 27, 2001

(54) MAGNETO-RESISTANCE RECORDING MEDIA COMPRISING A FOUNDATION LAYER AND A C-OVERCOAT

(75) Inventor: Ga-Lane Chen, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/334,924

(22) Filed: Jun. 17, 1999

Related U.S. Application Data

(60) Provisional application No. 60/102,302, filed on Sep. 28, 1998, and provisional application No. 60/109,231, filed on Nov. 18, 1998.

(51) Int. Cl.$^7$ ............................................. G11B 5/72
(52) U.S. Cl. ...................... 428/216; 428/336; 428/408; 428/446; 428/448; 428/694 TC; 428/694 TF; 428/900
(58) Field of Search ................................ 428/216, 336, 428/408, 446, 448, 694 TC, 694 TF, 900

(56) References Cited

U.S. PATENT DOCUMENTS

| 4,647,494 | * | 3/1987 | Meyerson et al. | 428/216 |
|---|---|---|---|---|
| 4,713,279 | | 12/1987 | Fujiwara et al. | 428/142 |
| 4,755,426 | * | 7/1988 | Kokai et al. | 428/336 |
| 4,839,244 | * | 6/1989 | Tsukamoto et al. | 428/694 |
| 5,227,211 | * | 7/1993 | Eltoukhy et al. | 428/64 |
| 5,607,783 | | 3/1997 | Onodera | 428/694 T |
| 5,871,841 | * | 2/1999 | Kuratomi | 428/332 |
| 6,132,875 | * | 10/2000 | Kiuchi et al. | 428/408 |

FOREIGN PATENT DOCUMENTS

| 3027162 | * | 2/1981 | (DE) . |
|---|---|---|---|
| 01-287819 | * | 4/1989 | (JP) . |
| 95/23878 | * | 9/1995 | (WO) . |

* cited by examiner

Primary Examiner—Stevan A. Resan
(74) Attorney, Agent, or Firm—McDermott, Will & Emery

(57) ABSTRACT

A magnetic recording medium is provided with a dual protective overcoat system, comprising a foundation layer and a carbon overcoat thereon, for improved tribological properties at very low glide heights and long term durability. Embodiments include magnetic recording media comprising a silicon oxide foundation layer over a magnetic layer and an amorphous hydrogenated carbon or an amorphous hydrogen-nitrogenated carbon overcoat on the foundation layer. Other embodiments include magnetic recording media with a foundation layer comprising silicon nitride over a magnetic layer and an amorphous hydrogenated carbon or an amorphous hydrogen-nitrogenated carbon overcoat on the foundation layer.

15 Claims, 4 Drawing Sheets

MAGNETO-RESISTANCE RECORDING MEDIA COMPRISING A FOUNDATION LAYER AND A C-OVERCOAT

RELATED APPLICATIONS

This application claims priority from provisional patent application Serial No. 60/102,302 filed Sep. 28, 1998, entitled "DUAL LAYER OVERCOAT DLC/SIO$_x$ FOR MR& GMR MEDIA," the entire disclosure of which is hereby incorporated by reference herein.

This application also claims priority from provisional patent application Serial No. 60/109,231 filed Nov. 18, 1998, entitled "FLASH LAYER OVERCOAT (FLO) FOR GMR & MR MEDIA," the entire disclosure of which is hereby incorporated by reference herein.

TECHNICAL FIELD

The present invention relates to magnetic recording media, particularly rotatable magnetoresistance (MR) or giant magnetoresistance (GMR) recording media, such as thin film magnetic disks cooperating with a magnetic transducer head. The present invention has particular applicability to high areal density magnetic recording media designed for drive programs having reduced flying height, or pseudo-contact/proximity recording.

BACKGROUND ART

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too smooth, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers. The surface of an underlayer can also be textured, and the texture substantially replicated in subsequently deposited layers.

Conventional longitudinal recording media typically comprise a substrate, such as aluminum (Al) or an Al alloy, e.g., aluminum-magnesium (Al—Mg) alloy, plated with a layer of amorphous nickel-phosphorus (NiP). Alternative substrates include glass, ceramic, glass-ceramic, and polymeric materials and graphite. The substrate typically contains sequentially deposited on each side thereof at least one underlayer, such as chromium (Cr) or a Cr-alloy, e.g., chromium vanadium (CrV), a cobalt (Co)-base alloy magnetic layer, a protective overcoat typically containing carbon, and a lubricant. The underlayer, magnetic layer and protective overcoat, are typically sputter deposited in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface.

In accordance with conventional practices, a lubricant topcoat is uniformly applied over the protective overcoat to prevent wear between the disk and head interface during drive operation. Excessive wear of the protective overcoat increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction.

A conventional material employed for the lubricant topcoat comprises a perfluoro polyether (PFPE) which consists essentially of carbon, fluorine and oxygen atoms. The lubricant is typically dissolved in an organic solvent, applied and bonded to the carbon overcoat of the magnetic recording medium by techniques such as dipping, buffing, thermal treatment, ultraviolet (UV) irradiation and soaking. A significant factor in the performance of a lubricant topcoat is the bonded lube ratio which is the ratio of the amount of lubricant bonded directly to the carbon overcoat of the magnetic recording medium to the amount of lubricant bonded to itself or to a mobile lubricant. Desirably, the bonded lube ratio should be between 0.3 to 0.7 (e.g. about 0.5 (50%)) to realize a meaningful improvement in stiction and wear performance of the resulting magnetic recording medium.

The escalating requirements for high areal recording density impose increasingly greater requirements on thin film magnetic recording media in terms of coercivity, stiction, squareness, medium noise and narrow track recording performance. In addition, increasingly high areal recording density and large-capacity magnetic disks require smaller flying heights, i.e., the distance by which the head floats above the surface of the disk in the CSS drive (head-disk interface). For conventional media design, a decrease in the head to media spacing increases stiction and drive crash, thereby imposing an indispensable role on the carbon-protective overcoat.

There are various types of carbon, some of which have been employed for a protective overcoat in manufacturing a magnetic recording medium. Such types of carbon include hydrogenated carbon, graphitic carbon or graphite, and nitrogenated carbon or carbon nitride and hydrogen-nitrogenated carbon. These types of carbon are well known in the art and, hence, not set forth herein in great detail.

Generally, hydrogenated carbon or amorphous hydrogenated carbon has a hydrogen concentration of about 5 at. % to about 40 at. %, typically about 20 at. % to about 30 at. %. Hydrogenated carbon has a lower conductivity due to the elimination of the carbon band-gap states by hydrogen. Hydrogenated carbon also provides effective corrosion protection to an underlying magnetic layer. Amorphous carbon nitride, sometimes referred to as nitrogenated carbon, generally has a nitrogen to hydrogen concentration ratio of about 5:20 to about 30:0. Hydrogen-nitrogenated carbon generally has a hydrogen to nitrogen concentration ratio of about 30:10 to 20:10 (higher concentration of hydrogen than nitrogen). Amorphous (a) hydrogen-nitrogenated carbon can be represented by the formula a-$CH_xN_y$, wherein "x" is about 0.05 (5.0 at. %) to about 0.20 (20 at. %), such as about 0.1 (10 at. %) to about 0.2 (20 at. %), and "y" about 0.03 (3.0 at. %) to about 0.30 (30 at. %), such as about 0.03 (3.0 at. %) to about 0.07 (7.0 at. %). A particularly suitable composition is a-$CH_{0.15}N_{0.05}$. Graphitic carbon or graphite contains substantially no hydrogen and nitrogen.

The drive for high areal recording density and, consequently, reduced flying heights, challenges the capabilities of conventional manufacturing practices. For example, a suitable protective overcoat must be capable of preventing corrosion of the underlying magnetic layer, which is an electrochemical phenomenon dependent upon factors such as environmental conditions, e.g., humidity and temperature. In addition, a suitable protective overcoat must prevent migration of ions from underlying layers into the lubricant topcoat and to the surface of the magnetic recording medium forming defects such as asperities. A protective overcoat must also exhibit the requisite surface for wear resistance, lower stiction, and some polarity to enable bonding thereto of a lubricant topcoat in an adequate thickness.

Furthermore, as the head disk interface decreases to less than about 1 $\mu$inch, it is necessary to reduce the thickness of the carbon-containing protective overcoat to below about 100 Å in order to improve the performance of the magnetic recording and reduce the spacing loss between the read/write head and magnetic recording medium surface. However, when the thickness of the carbon-containing protective overcoat is reduced to below about 100 Å, head crash is encountered because it exhibits very poor tribological properties and low reliability. Most GMR and MR media overcoats comprise a single layer of carbon material, such as amorphous hydrogenated carbon or amorphous nitrogenated carbon and exhibit adequate reliability at a thickness of about 125 Å to about 250 Å. However, as the thickness of the carbon-containing overcoat is reduced to below about 100 Å, head crash occurs, presumably because of lower wear resistance and the discontinuities formed in the sputter deposited layer.

Onodera, in U.S. Pat. No. 5,607,783, discloses a magnetic recording medium containing single or plural carbon-containing protective layers with increasing hydrogen content. Fujiwara et al., in U.S. Pat. No. 4,713,279, disclose a magnetic recording medium comprising a silicon dioxide protective layer having a thickness of about 230 Å0 to about 250 Å and an amorphous carbon lubricant layer having a thickness of about 260 Å to about 265 Å thereon.

In copending U.S. patent application Ser. No. 09/176,892 filed on Oct. 22, 1998 now U.S. Pat. No. 6,136,421 issued Oct. 24, 2000, a multilayer protective overcoat is disclosed which contains a silicon nitride oxide overcoat and a carbon-containing overcoat formed on the silicon nitride oxide overcoat. The carbon-containing overcoat can be amorphized hydrogenated carbon (a-C:H), amorphous nitrogenated carbon (a-C:N) or amorphous hydrogenated-nitrogenated carbon (a-C:HN).

There exists a continuing need for a magnetic recording medium comprising a protective overcoat capable of satisfying the imposing demands for high areal recording density and reduced head-disk interface. There also exists a particular need for an MR or a GMR magnetic recording medium having a protective overcoat with a thickness of less than about 100 Å with excellent tribological properties at very low glide heights and long term durability.

DISCLOSURE OF THE INVENTION

An advantage of the present invention is an effective MR or GMR magnetic recording medium comprising a protective overcoat having a thickness less than about 100 Å and exhibiting excellent tribological properties at very low glide heights and long term durability.

Additional advantages and other features of the present invention will be set forth in part in the description which follows and in part will become apparent to those having ordinary skill in the art upon examination of the following disclosure or may be learned from the practice of the present invention. The advantages of the present invention may be realized and obtained as particularly pointed out in the appended claims.

According to the present invention, the foregoing and other advantages are achieved in part by a magnetic recording medium having a dual protective overcoat over a magnetic layer, the dual protective overcoat having a thickness no greater than about 100 Å and comprising: a foundation layer over the magnetic layer; and a carbon-containing overcoat on the foundation layer.

Another aspect of the present invention is a magnetic recording medium having a dual protective overcoat over a magnetic layer, the dual protective overcoat comprising: a foundation layer comprising silicon nitride ($SiN_y$), when "y" is about 0.1 to about 1.33; and a carbon-containing overcoat on the foundation layer.

Embodiments of the present invention include forming a dual layer overcoat system comprising an initial foundation layer, e.g., a silicon oxide ($SiO_x$), wherein x is about 0 to about 2.0, thereby inclusive of silicon, or silicon nitride ($SiN_y$), and a then sputter depositing the carbon-containing overcoat thereon. Suitable carbon-containing overcoats include amorphous hydrogenated carbon (a-C:H) or amorphous hydrogen-nitrogenated carbon (a-$C:H_bN_c$), wherein "b" is about 0.05 to about 0.20 and "c" is about 0.03 to about 0.30. Advantageously, the thickness of the dual protective overcoat, inclusive of the foundation layer and carbon-containing overcoat, is less than about 75 Å. Other embodiments include forming a dual protective overcoat system by sputter depositing a foundation layer comprising silicon nitride ($SiN_y$) and sputter depositing an a-C:H or a-$C:H_bN_c$ overcoat thereon at a combined thickness less than about 45 Å, e.g., less than about 35 Å.

Additional advantages of the present invention will become readily apparent to those having ordinary skill in the art from the following detailed description, wherein the embodiments of the present invention are described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

DESCRIPTION OF THE INVENTION

Figure 1:
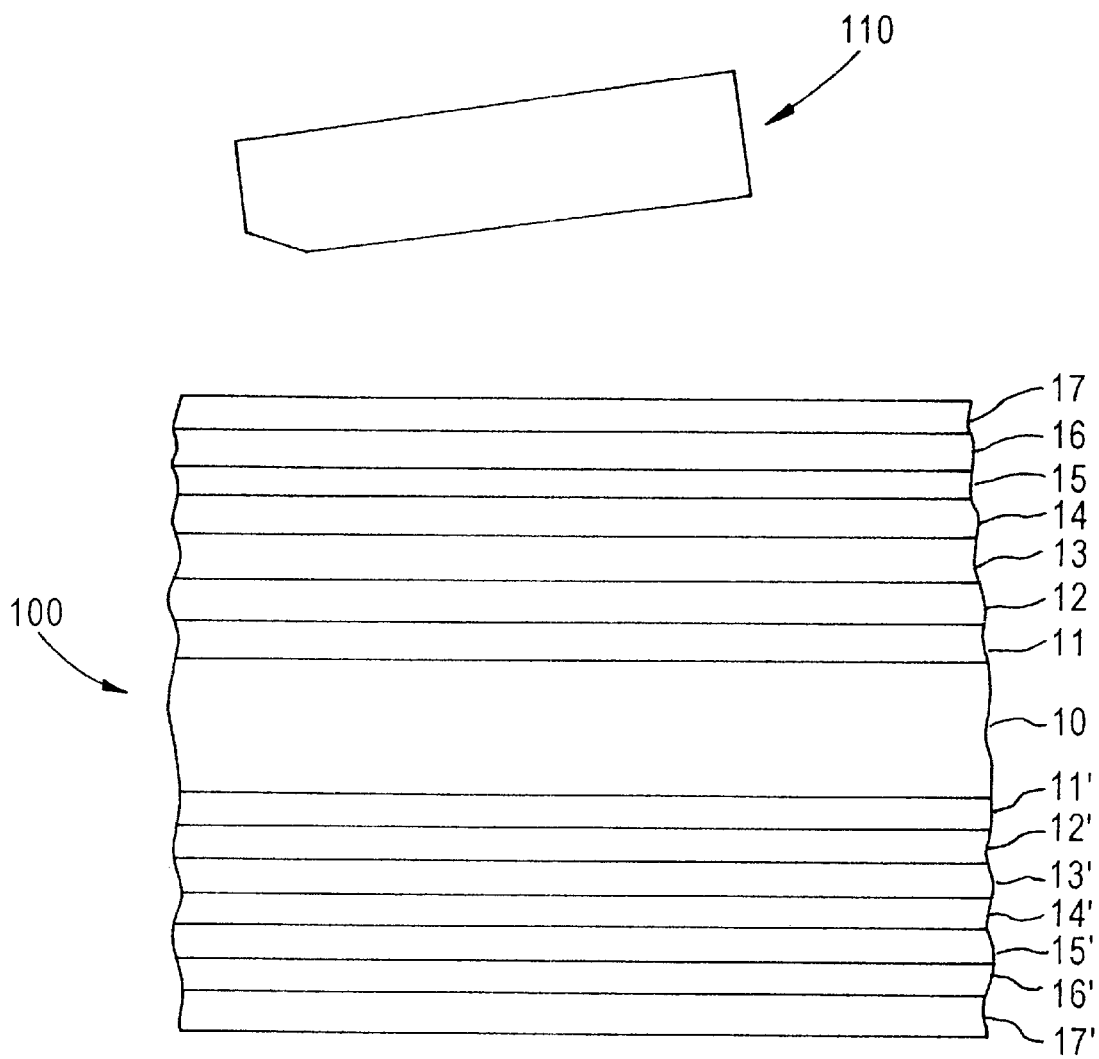
FIG. 1 schematically illustrates a magnetic recording medium in accordance with an embodiment of the present invention.

The present invention enables the manufacture of MR and GMR magnetic recording media containing a dual protective overcoat system having a thickness less than about 100 Å while exhibiting excellent tribological properties at a very low glide height, e.g., below about 1μ inch, and with long term durability. Embodiments of the present invention, therefore, enable the manufacture of MR and GMR magnetic recording media with improved magnetic recording performance and reduced spacing loss between the read/write head and magnetic recording surface by reducing the overcoat thickness to even less than 75 Å, e.g., less than about 45 Å, including less than about 35 Å.

Embodiments of the present invention comprise forming a dual protective overcoat system by sputter depositing a $SiO_x$ or $SiN_y$ foundation layer and then sputter depositing an a-C:H or an $a\text{-}C:N_bH_c$ overcoat on the foundation layer. A lubricant topcoat, e.g., a conventional perfluoro polyether (PFPE) lubricant, is then applied to the a-C:H or a-C:$N_bH_c$ overcoat. Advantageously, the dual protective overcoat system of the present invention effectively prevents corrosion of the underlying magnetic layer, prevents migration of ions from underlying layers, and enables adequate bonding of a lubricant topcoat thereto at a desirable thickness, such as about 5 Å to about 10 Å.

In an embodiment of the present invention, a dual protective overcoat system is formed on a magnetic layer by initially sputter depositing a thin $SiO_x$ layer as a foundation layer and subsequently depositing an a-C:H or a-C:$N_bH_c$ as the carbon-containing protective overcoat on the foundation layer. Advantageously, the combined thickness of the dual protective overcoat system containing the $SiO_x$ foundation layer and a-C:H or a-C:$N_bH_c$ overcoat is less than about 75 Å. For example, the $SiO_x$ foundation layer can be sputter deposited at a thickness of about 30 Å to about 40 Å, and the a-C:H or a-C:$N_bH_c$ overcoat can be sputter deposited at a thickness of about 10 Å to about 35 Å.

In another embodiment of the present invention, a $SiN_y$ foundation layer is sputter deposited on a magnetic layer and a flash overcoat layer of a-C:H or a-C:$H_bN_c$ sputter deposited at a thickness less than about 10 Å, e.g., about 5 Å to about 10 Å. The $SiN_x$ layer can be deposited at a thickness less than about 35 Å, e.g., about 25 Å to about 35 Å. In various embodiments of the present invention, magnetic recording media are produced which are capable of passing 20,000 cycles on a CSS test without failure, employing an MR slider.

The exact operative mechanism enabling the formation of a uniform, continuous protective overcoat at a thickness of less than about 75 Å, e.g., less than 45 Å, while avoiding head crash is not known with certainty. However, it is believed that the initially deposited foundation layer enables the formation of a layer of a carbon-containing overcoat having a uniform thickness without discontinuities or voids, thereby enabling excellent tribological properties at a very low glide height, e.g., less than about 1 μinch, with long term durability.

Magnetic recording media in accordance with the present invention can comprise any conventional substrate, such as NiP/Al or an NiP/Al alloy substrate, Al or an Al alloy substrate, or a glass, ceramic, glass-ceramic or polymeric substrate. The present invention can be implemented employing any of the various seedlayers, underlayers, magnetic layers and lubricant topcoats conventionally employed in manufacturing magnetic recording media. For example, embodiments of the present invention comprise the use of a Cr or Cr alloy underlayer or underlayers, Co-alloy magnetic layers and PFPE lubricants for enhance durability.

An embodiment of the present invention is schematically illustrated in FIG. 1 and comprises an MR or a GMR medium 100 and slider 110. The medium comprises a substrate 10, e.g., Al, an Al alloy, a polymer, a glass, a ceramic, or a glass-ceramic, having sequentially deposited on each side thereof a first seedlayer 11,11; e.g., NiP, and an NiAl seedlayer 12, 12' thereon. An underlayer 13, 13', e.g. CrMo, is deposited on seedlayer 14, 14' and a magnetic layer 15, 15', e.g. a colbalt-chromium-platinum-tantalum-niobium (CoCrPtTaNb) alloy layer is deposited on the underlayer 13, 13'.

In accordance with the present invention, a foundation layer 15, 15' comprising $SiO_x$ or $SiN_y$ is reactively sputter deposited on magnetic layer 14, 14', and a carbon-containing overcoat 16, 16', such as a-C:H or a-C:$H_bN_c$, is deposited on foundation layer 15, 15'. Advantageously, in accordance with the present invention, the composite thickness of layers 15, 16 or 15', 16', is less than 75 Å, e.g. less than 45 Å. A lubricant topcoat 17, 17' is then formed on the composite overcoat.

EXAMPLES

Magnetic recording disks were made by sputter depositing and a nickel aluminum (NiAl) seedlayer on NiP/aluminum substrates. A chromium-molybdenum underlayer was deposited on the NiAl seedlayer and a cobalt-chromium-platinum-tantalum-niobium magnetic alloy layer was sputter deposited on the underlayer. A foundation layer of $SiO_x$ was then sputter deposited at a thickness of about 35 Å to about 38 Å on the magnetic layer, an a-C:H or a-C:$N_bH_c$ overcoat, was sputter deposited at a thickness of about 12 Å to about 17 Å on the foundation layer. A conventional PFPE lubricant was then deposited at a thickness of about 25 Å. The disks successfully passed 20,000 cycles of CSS testing without failure. The same disks with a conventional overcoat could not perform greater than 500 cycles prior to crash.

In other examples, disks were prepared by sputter depositing a $SiN_x$ foundation layer at a thickness of about 25 Å to about 35 Å on the magnetic layer and then depositing a flash a-C:H or a-C:$N_bH_c$ at a thickness of about 5 Å to about 10 Å on the $SiN_x$ foundation layer. A conventional PFPE lubricant was deposited at a thickness of about 25 Å. These disks also successfully passed 20,000 cycles of CSS testing without failure.

Samples containing a $SiO_x$ foundation layer and a-C:H overcoat were analyzed by employing ESCA (Electron Spectroscopy for Chemical Analysis) survey spectra to confirm the composition and film structure. Table I below shows the elemental composition in atom % of the top 50 Å of the surface of the disk with an $SiO_x$ foundation layer and a-C:H protective overcoat, with a PFPE lubrication layer. The depth profiles were taken from samples by monitoring C(1s), O(1s), Si(2p), N(1s) and Ni(2p) signal intensities as a function of etch depth. Spectra data were taken at 10 Å step increments with an etch rate of 100 Å per minute.

TABLE I

Elemental composition, expressed in atom %, of the top 50Å of the surface.

| sample ID | C | O | F | Si | Ni | P | Thickness of carbon layer (Å)1) | Thickness of Si layer (Å)1) |
|---|---|---|---|---|---|---|---|---|
| Y1 as received | 35. | 20. | 37. | 7.7 | — | — | | |
| 5Å off | 35. | 23. | — | 39. | 1.5 | 1.3 | | |
| 25Å off | 15. | 26. | — | 45. | 8.8 | 4.3 | | |
| 75Å off | 3.6 | 3.2 | — | 3.6 | 72. | 16. | | |
| Y2 as received | 33. | 21. | 38. | 7.9 | — | — | 14 | 38 |
| Y3 as received | 33. | 20. | 40. | 6.6 | — | — | 17 | 38 |
| Y4 as received | 34. | 21. | 37. | 8.1 | — | — | 14 | 38 |
| Y5 as received | 33. | 20. | 38. | 8.3 | — | — | 14 | 37 |
| Z1 as received | 29. | 23. | 38. | 11. | — | — | 12 | 36 |
| Z2 as received | 30. | 22. | 38. | 10. | — | — | 12 | 38 |
| Z3 as received | 31. | 22. | 38. | 8.5 | — | — | 15 | 36 |
| Z4 as received | 30. | 22. | 37. | 10. | — | — | 12 | 36 |

1)numbers are based on the etch rate in SiO2 (100Å/min).

Figure 2:
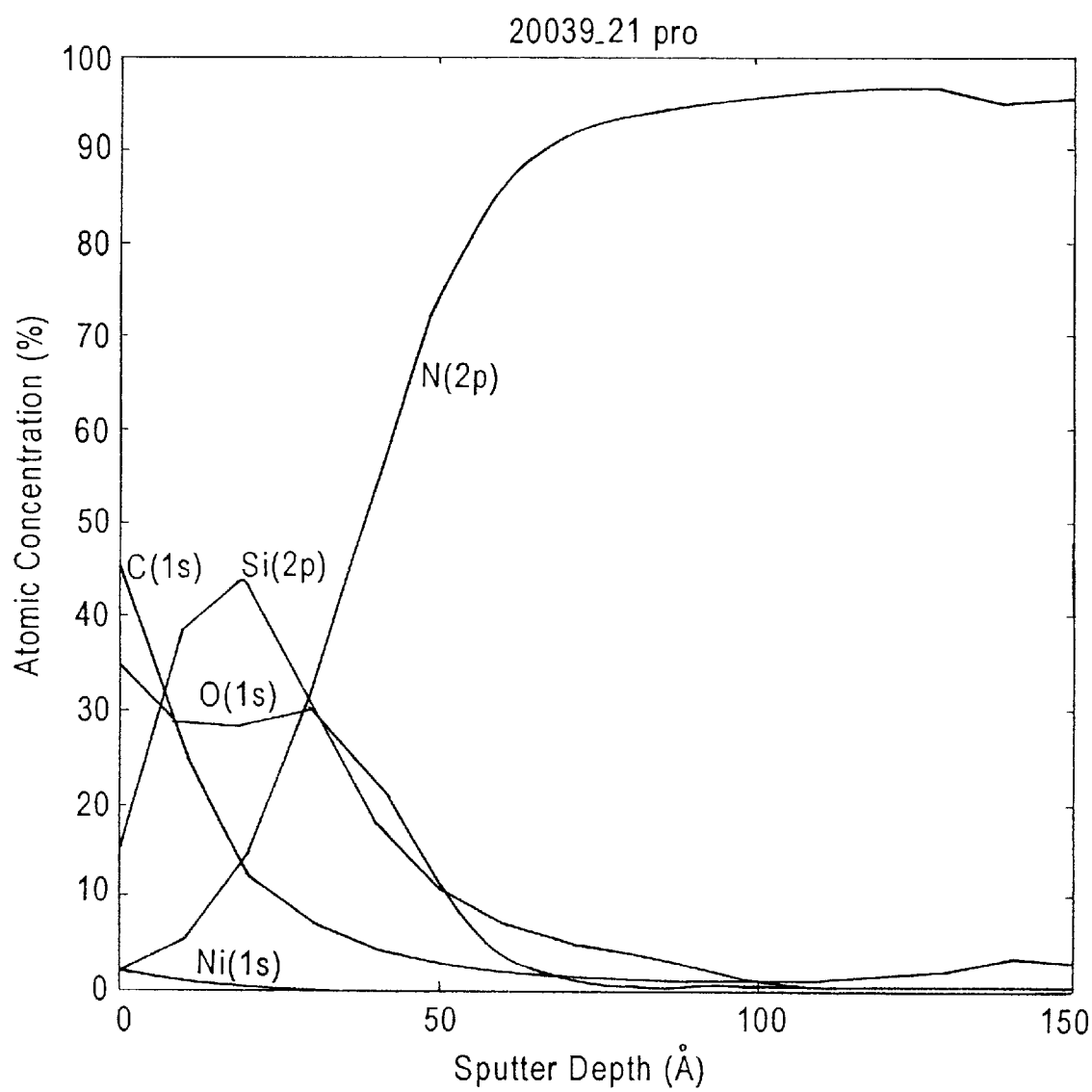
FIG. 2 is a depth profile of a dual protective overcoat system in accordance with an embodiment of the present invention.

The depth profile of the dual overcoat system is shown in FIG. 2. The carbon layer and $SiO_x$ layer thickness were measured from the half height of the C(1s) and Si(2p) signal intensities and the values given in Table I above. The thickness of the a-C:H layer was measured at 12 Å to 17 Å. According to the Si(2p) spectrum, the foundation layer consists of elemental silicon and silicon dioxide, and had a thickness of about 35 Å to 38 Å. No nitrogen was detected in any of the samples at a detection limit of approximately 1 at. %.

Figure 3:
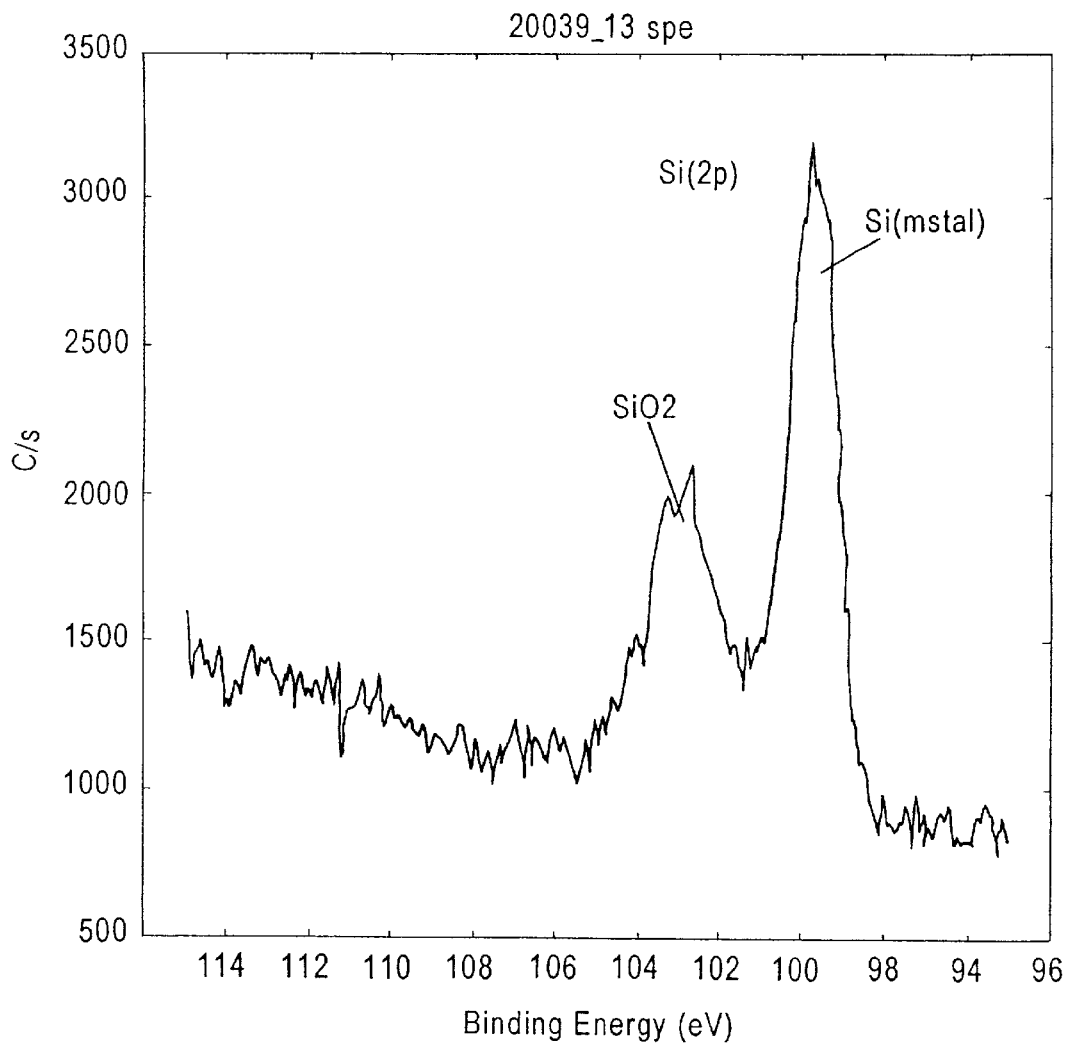
FIG. 3 is a high resolution spectrum of a foundation layer in accordance with an embodiment of the present invention.

The high resolution XPS (X-ray Photoelectron Spectorscopy) spectrum Si(2p) is shown in FIG. 3. Based upon the binding energy location, the foundation layer comprises a mixture of elemental silicon and silicon oxide.

Figure 4:
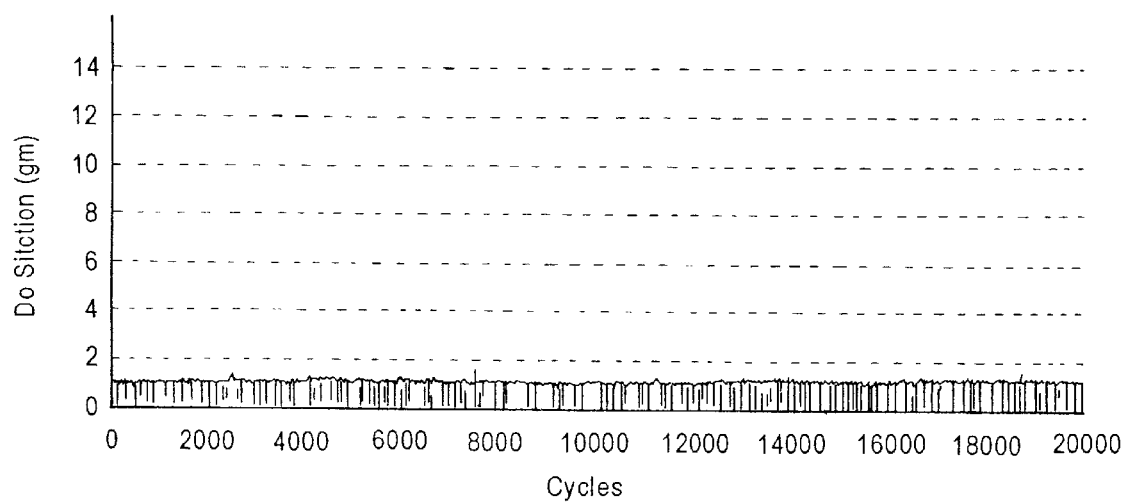
FIG. 4 shows CSS testing of a magnetic recording medium in accordance with an embodiment of the present invention.

FIG. 4 shows CSS testing results for the dual protective overcoat system of the present invention containing an SiOX foundation layer. An MR slider was used to perform the contact-start-stop (CSS) testing. The samples passed 20,000 cycles of CSS testing without failure.

The present invention provides magnetic recording media having a protective carbon overcoat at a thickness significantly less than 100 Å, e.g. less than 45 Å, for MR and MRG recording without encountering head crash, by providing a $SiO_x$ or $SiN_y$ foundation layer under a carbon-containing overcoat. Magnetic recording media in accordance with the present invention exhibit excellent tribological properties at very low glide heights, e.g. less than about 1 μinch, with long term durability.

The present invention can be advantageously employed to produce any of various types of magnetic recording media, including thin film disks. The present invention is particularly applicable in producing high areal recording density magnetic recording media requiring a low flying height.

Only the preferred embodiment of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A magnetic recording medium having a dual protective overcoat over a magnetic layer, the dual protective overcoat having a thickness no greater than about 100 Å and comprising:
   a foundation layer over the magnetic layer; and
   a carbon-containing overcoat on the foundation layer wherein:
      the foundation layer comprises silicon oxide ($SiO_x$), wherein x is about 0 to about 2.0;
      the carbon-containing overcoat comprises amorphous hydrogenated carbon (a-C:H) or amorphous hydrogen-nitrogenated carbon (a-C:$H_b N_c$), wherein "b" is about 0.05 to about 0.20 and "c" is about 0.03 to about 0.30; and
      the foundation layer comprises a mixture of elemental silicon and silicon oxide.

2. The magnetic recording medium according to claim 1, wherein the dual protective overcoat has a thickness no greater than about 75 Å.

3. The magnetic recording medium according to claim 2, wherein:
   the foundation layer has a thickness of about 25 Å to about 40 Å; and
   the carbon-containing overcoat has a thickness of about 10 Å to about 35 Å.

4. The magnetic recording medium according to claim 1, comprising:
   a non-magnetic substrate;
   at least one underlayer;
   the magnetic layer on the underlayer; and
   a lubricant topcoat on the dual protective overcoat.

5. The magnetic recording medium according to claim 4, further containing a seedlayer on the substrate and at least one underlayer on the seedlayer.

6. The magnetic recording medium according to claim 4, wherein:
   the substrate comprises nickel-phosphorous coated on aluminum or an aluminum alloy;
   the seedlayer comprises nickel-aluminum;
   the underlayer comprises chromium-molybdenum; and
   the magnetic layer comprises a cobalt-chromium-platinum-tantalum-niobium alloy.

7. The magnetic recording medium according to claim 4, wherein the substrate comprises aluminum or an aluminum alloy, nickel-phosphorous coated aluminum or an aluminum alloy, or a glass, ceramic, glass-ceramic or polymeric material.

8. The magnetic recording medium according to claim 4, wherein the lubricant topcoat comprises a perfluoro polyether.

9. A magnetic recording medium having a dual protective overcoat over a magnetic layer, the dual protective overcoat comprising:
   a foundation layer comprising silicon nitride ($SiN_y$), wherein "y" is about 0.1 to about 1.33; and
   a carbon-containing overcoat on the foundation layer;

wherein the dual protective overcoat has a thickness no greater than about 45 Å, and the carbon-containing overcoat comprises amorphous hydrogenated carbon (a-C:H) or amorphous hydrogen-nitrogenated carbon (a-CH$_b$N$_c$), wherein "b" is about 0.5 to about 0.20 and "c" is about 0.03 to about 0.30.

10. The magnetic recording medium according to claim 9, wherein: the foundation layer has a thickness of about 25 Å to about 35 Å; and the carbon-containing overcoat has a thickness of about 5 Å to about 10 Å.

11. The magnetic recording medium according to claim 9, containing:
- a non-magnetic substrate;
- at least one underlayer; the magnetic layer on the underlayer; and
- a lubricant topcoat on the protective overcoat.

12. The magnetic recording medium according to claim 11, further containing a seedlayer on the substrate and at least one underlayer on the seedlayer.

13. The magnetic recording medium according to claim 11, wherein:
- the substrate comprises nickel-phosphorous coated on aluminum or an aluminum alloy;
- the seedlayer comprises nickel-alumina;
- the underlayer comprises chromium-molybdenum; and
- the magnetic layer comprises a cobalt-chromium-platinum-tantalum-niobium alloy.

14. The magnetic recording medium according to claim 11, wherein the substrate comprises aluminum or an aluminum alloy, nickel-phosphorous coated aluminum or a aluminum alloy, or a glass, ceramic, glass-ceramic or polymeric material.

15. The magnetic recording medium according to claim 11, wherein the lubricant topcoat comprises a perfluoro polyether.

* * * * *